United States Patent [19]
Sakurai et al.

[11] Patent Number: 5,299,185
[45] Date of Patent: Mar. 29, 1994

[54] DISC PLAYER FOR PLAYING BOTH NAKED DISC AND CARTRIDGE-ENCASED DISC

[75] Inventors: Katsuichi Sakurai, Kanagawa; Hideo Kawachi, Tokyo; Toshiyuki Arai, Kanagawa, all of Japan

[73] Assignee: Sony Corporation, Tokyo, Japan

[21] Appl. No.: 920,850

[22] Filed: Jul. 28, 1992

[30] Foreign Application Priority Data

Jul. 31, 1991 [JP] Japan .................................. 3-191522

[51] Int. Cl.⁵ .............................................. G11B 33/02
[52] U.S. Cl. .................. 369/75.2; 369/77.2; 360/98.04
[58] Field of Search ............... 360/99.06, 98.06, 98.04; 369/75.2, 77.1, 77.2

[56] References Cited

U.S. PATENT DOCUMENTS

| | | |
|---|---|---|
| 4,845,700 | 7/1989 | Koizumi et al. |
| 5,010,428 | 4/1991 | D'Arc .................... 360/99.06 |
| 5,119,354 | 6/1992 | Umesaki ................. 369/77.1 X |
| 5,172,361 | 12/1992 | Urushibata et al. ......... 369/75.2 X |

FOREIGN PATENT DOCUMENTS

| | | |
|---|---|---|
| 0330731 | 9/1989 | European Pat. Off. |
| 0368242 | 5/1990 | European Pat. Off. |
| 0391424 | 10/1990 | European Pat. Off. |
| 0400949 | 12/1990 | European Pat. Off. |
| 0436877 | 7/1991 | European Pat. Off. |
| 01-33254 | 5/1989 | Japan .................. 369/258 |

*Primary Examiner*—Edward K. Look
*Assistant Examiner*—Hoang Nguyen
*Attorney, Agent, or Firm*—William S. Frommer; Alvin Sinderbrand

[57] ABSTRACT

A disc player is shown which can play both a naked disc and a disc encased in a cartridge. A disc tray is movable on a single horizontal way to take at least first, second and third positions which are respectively the position for receiving or ejecting the naked disc, the position for practically playing the naked disc and the position which is distant from the second and third positions. When playing of the cartridge is intended, the disc tray is moved to the third position to permit the cartridge to take a loaded position at which the cartridge is practically played.

18 Claims, 15 Drawing Sheets

FIG.3

DISC PLAYER FOR PLAYING BOTH NAKED DISC AND CARTRIDGE-ENCASED DISC

BACKGROUND OF THE INVENTION

1. Field of the Invention

The present invention relates in general to disc players which can play acoustic or visual discs, and more particularly to disc players of a type which can play a naked disc as well as a cartridge-encased disc (viz., a disc encased in a cartridge). For ease of description, such cartridge-encased disc will be referred to as just "cartridge" in the following.

2. Description of the Prior Art

Hitherto, in order to enjoy or play both a naked disc and a cartridge, it has been necessary to use two types of disc players. However, as is known, installation of such two types of disc players in a common replaying equipment tends to cause a bulky and costly construction of the equipment. Although some of disc players for the cartridge can play the naked disc if the disc has been put in a separate cartridge before being set in the player, the manual work for putting the naked disc into the cartridge is difficult or at least troublesome.

SUMMARY OF THE INVENTION

It is therefore an object of the present invention to provide a disc player which can play the naked disc as well as the cartridge.

According to the present invention, there is provided a disc player of the above-mentioned type, which is economical and compact in size particularly reduced in thickness.

According to the present invention, there is provided a disc player of the above-mentioned type, handling of which is very easy.

According to the present invention, there is provided an apparatus for playing both a naked disc and a disc encased in a cartridge, the disc being of a recording medium. The apparatus comprises means defining an inlet opening; a disc tray movable to take a first position at which the disc tray can receive the naked disc, a second position at which loading of the received naked disc is completed and a third position which is opposite to the first position with respect to the second position, the disc tray being movable between the first and second positions through the inlet opening; a cartridge carrying mechanism for receiving the cartridge inserted through the inlet opening and carrying the cartridge to a loading position at which loading of the cartridge is completed; chucking means for chucking the naked disc; a turn table pivotal between a working position and a rest position, the turn table being capable of driving either one of the loaded naked disc and the disc in the loaded cartridge when assuming the working position; a naked disc detecting means issuing an information as to whether or not the naked disc is on the disc tray at the second position; and control means for controlling the position of the disc tray in accordance with the information from the naked disc detecting means, the controlling means permitting the disc tray to move to the third position when the naked disc detecting means detects absence of the naked disc on the disc tray at the second position.

BRIEF DESCRIPTION OF THE DRAWINGS

Other objects and advantages of the present invention will become apparent from the following description when taken in conjunction with the accompanying drawings, in which:

FIG. 3 is a plan view of the essential mechanism of the disc player, showing a condition wherein a disc tray is ejected from a player housing (not shown);

DETAILED DESCRIPTION OF THE INVENTION

Figure 16A:
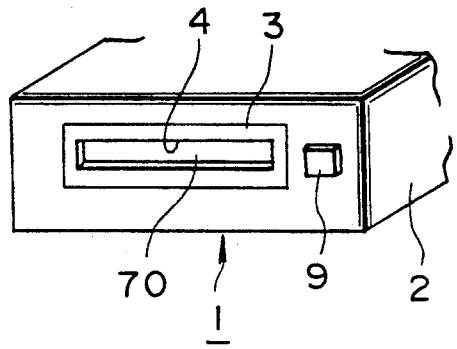
FIGS. 16A, 16B and 16C are front views of the disc player, showing various conditions of the same.
Figure 16B:
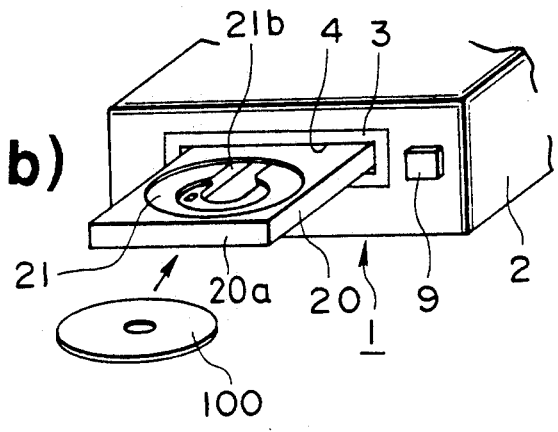
Figure 16C:
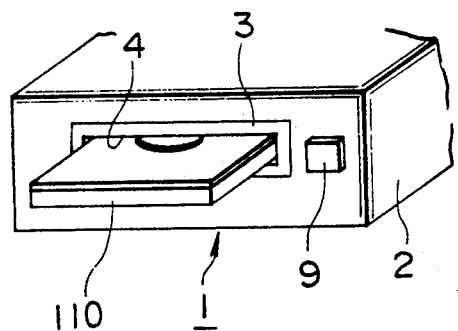

Referring to FIGS. 16A, 16B and 16C of the drawings, there is shown but partially a disc player 1 according to the present invention.

In the following, the terms "right", "left", "front", "rear", "forward", "rearward" and the like are to be understood with respect to a viewer who stands in front of the disc player 1 facing the same.

As will become apparent as the description proceeds, the disc player 1 of the present invention is constructed to play both a naked disc 100 (see FIG. 16B) and a cartridge 110 (see FIG. 16C).

The disc player 1 comprises a rectangular housing 2 in which an essential mechanism of the disc player 1 is installed. A rectangular front wall of the housing 2 has a rectangular opening (no numeral) in which a mouth panel 3 of the essential mechanism is fitted.

Figure 1:
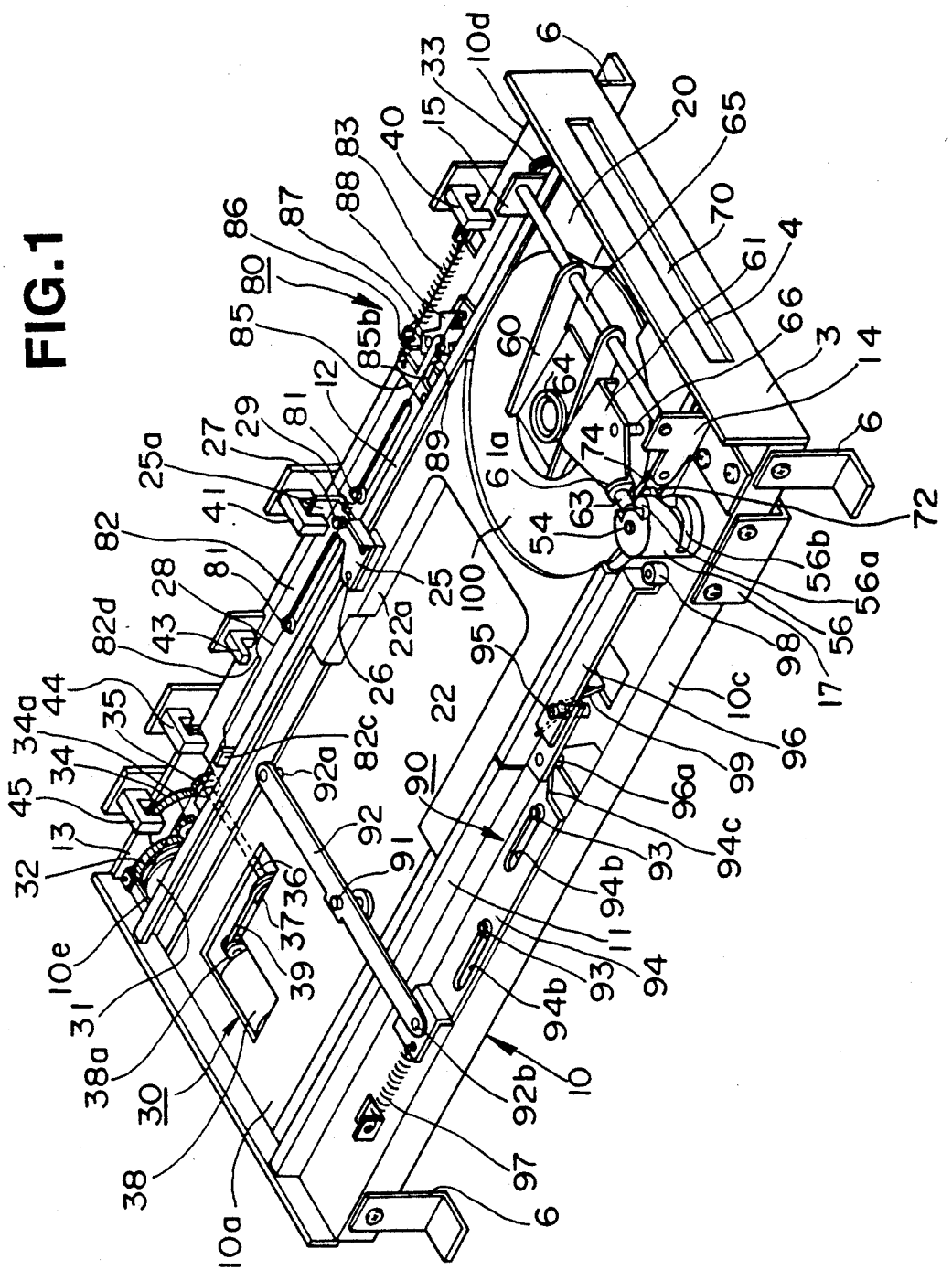
FIG. 1 is a perspective view of an essential mechanism of a disc player of the present invention, showing a condition wherein loading of a naked disc is completed.
Figure 11:
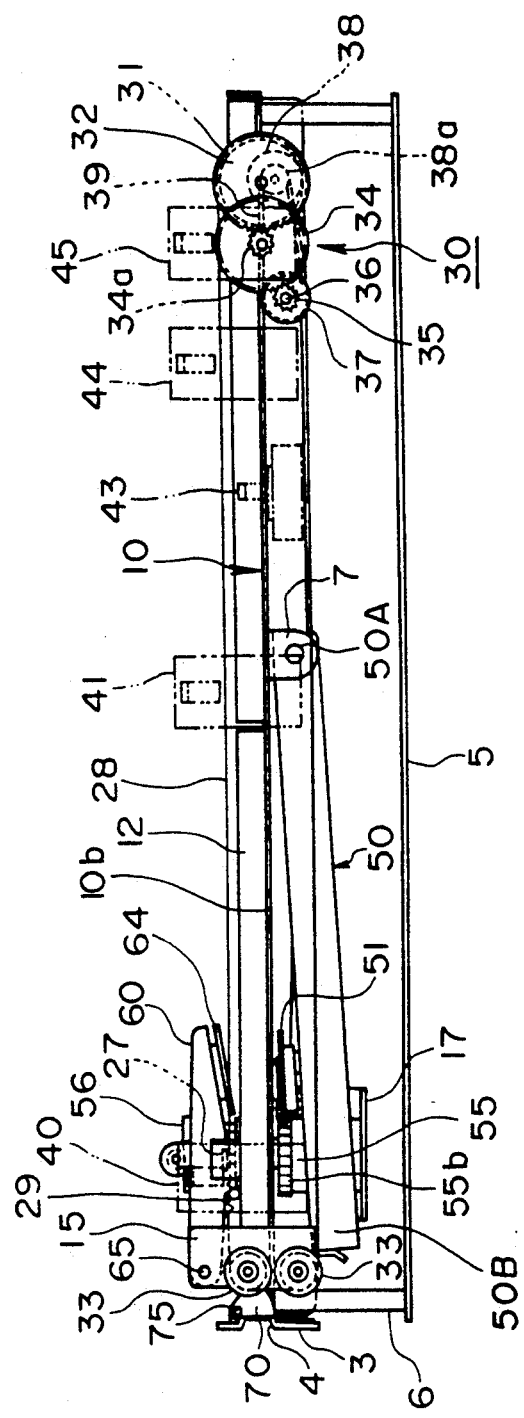
FIG. 11 is a side view of the essential mechanism of the disc player.

As will be understood from FIGS. 11 and 1, the housing 1 has a rectangular bottom wall 5 over which a base chassis 10 is tightly arranged through four L-shaped brackets 6. The base chassis 10 has an upper surface which is denoted by numeral 10a.

Figure 2:
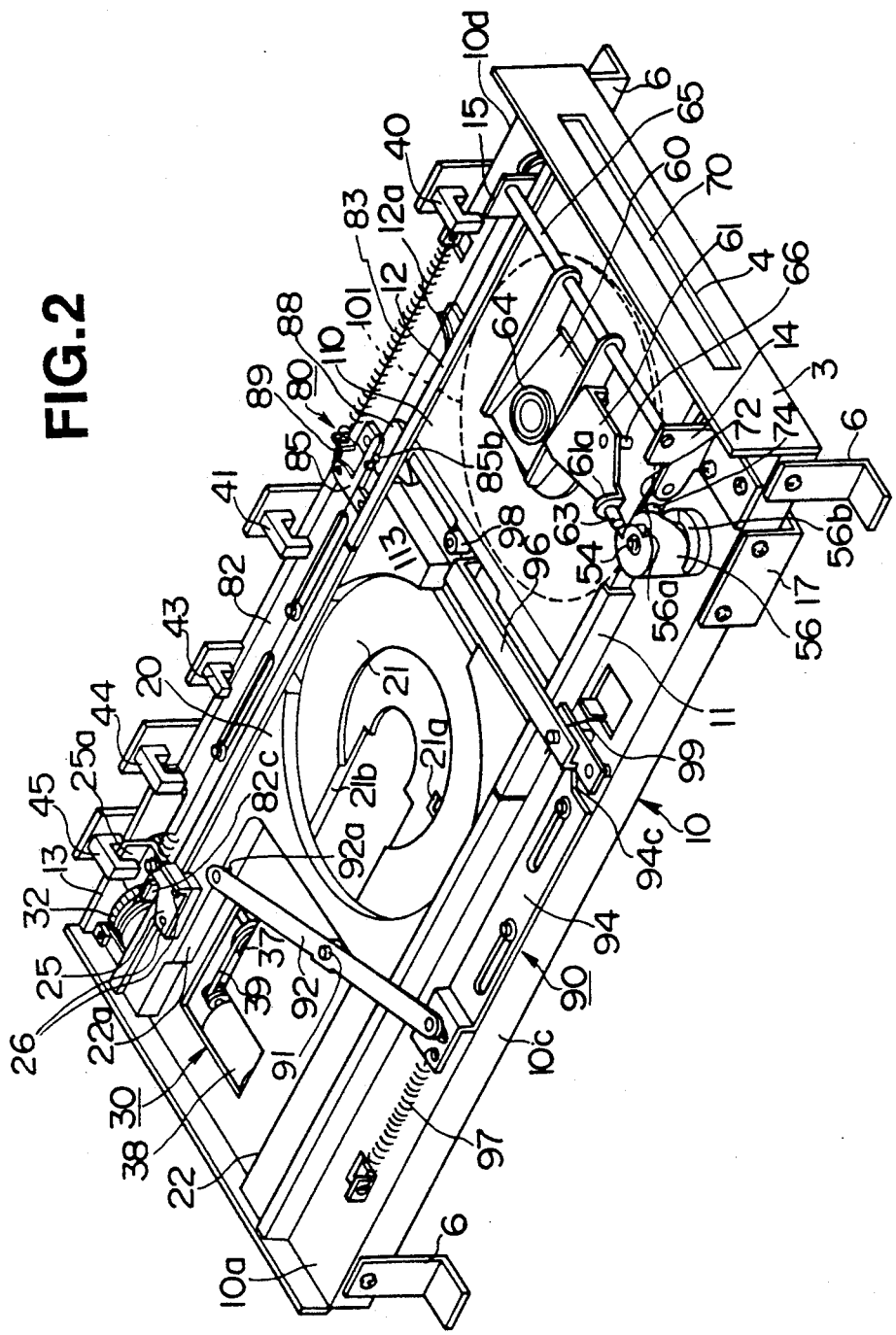
FIG. 2 is a view similar to FIG. 1, but showing a condition wherein loading of a cartridge is completed.

As is seen from FIG. 2, the mouth panel 3, which is constructed of a plastic, is fixed to a front end of the base chassis 10. The mouth panel 3 is formed with a rectangular slot 4.

As will be described hereinafter, upon requirement of playing the naked disc 100, a disc tray (20) is ejected through the slot 4 for putting thereon the naked disc 100, while upon requirement of playing the cartridge 110, the disc tray (20) is moved back to its rearmost position for permitting insertion of the cartridge 110 through the slot 4.

As is seen from FIG. 11, below the base chassis 10, there is arranged a pivotal chassis 50 which has a rear end pivotally connected through a pivot shaft 50A to laterally spaced downward brackets 7 provided by the base chassis 10. The brackets 7 are positioned at a longitudinally middle part of the base chassis 10. Thus, the pivotal chassis 50 is pivotal about its rear end, so that a front end 50B of the pivotal chassis 50 can be raised and lowered below the base chassis 10.

As will be seen from FIGS. 1 and 2, a generally rectangular disc tray 20 is longitudinally movably disposed on the base chassis 10, which functions to carry the naked disc 100 to a given position below a generally rectangular opening 10b (see FIG. 3) formed in a front part of the base chassis 10. For guiding the movement of the disc tray 20, two plastic guide rails 11 and 12 are disposed on lateral sides of the base chassis 10. Each guide rail 11 or 12 is of a channel member in and along which a lateral edge of the disc tray 20 is slidably moved. That is, the disc tray 20 is movable forward (viz., toward the mouth panel 3) and rearward (viz., away from the mouth panel 3) on the base chassis 10 along the guide rails 11 and 12.

As will be understood from FIG. 2, the disc tray 20 is formed at its front portion with a circular depression 21 whose diameter is slightly larger than that of the naked disc 100. The circular depression 21 serves as a disc holding part for the naked disc 100 and has a center opening (no numeral) formed therethrough. The center opening is merged with a large rectangular aperture 21b which is formed in the circular depression 21 and extends rearward from the center opening. A small peep-hole 21a is formed in the bottom of the circular depression 21 near the center opening. The disc tray 20 has further a large rectangular cut 22 which extends from the middle part of the disc tray 20 to the rear end of the same. Thus, the disc tray 20 has at its rear part right and left leg portions between which the large rectangular cut 22 is defined.

As is seen from FIG. 2, the right leg portion of the disc tray 20 is formed at its inside wall with a stepped portion which forms an inclined cam surface 22a. A connecting plate 25 is fixed through bolts 26 to the right leg portion.

As is seen from FIGS. 1, 2, 3 and 4, the connecting plate 25 has a laterally extending part 25a bent upward, and a pin 27 (see FIG. 4) is fixed to the connecting plate 25 near the upward bent part 25a. The pin 27 has one end of a looped wire 28 fixed thereto. The other end of the wire 28 is fixed to the pin 27 through a coil spring 29.

As is seen from FIG. 11, the looped wire 28 is put around a drive pulley 31 arranged at a rear end of the base chassis 10 and a pair of driven pulleys 33 arranged at a front end of the base chassis 10. The paired driven pulleys 33 are rotatably connected to upper and lower portions of a bracket 15 which is fixed to the front end of the base chassis 10. As is seen from FIG. 1, the bracket 15 is a counterpart of another bracket 14 which is secured to the left front end of the base chassis 10.

As is seen from FIG. 1, the drive pulley 31 is rotatably connected to a bracket 13 fixed to the right rear end of the base chassis 10. For partially receiving the drive pulley 31, the base chassis 10 has near the bracket 13 a longitudinally extending slot 10e.

As is seen from FIG. 1, the drive pulley 31 is integrally formed with a gear 32 which is meshed with a smaller gear 34a of a twin gear body 34 which is rotatably connected to the bracket 13. A larger gear of the twin gear body 34 is meshed with a pinion 35 which has a rotation shaft 36 fixed thereto. The shaft 36 extends laterally below the base chassis 10. One end of the rotation shaft 36 is rotatably supported by the bracket 13, and the other end of the shaft 36 has a pulley 37 fixed thereto. A drive pulley 38a driven by an electric motor 38 is positioned near the pulley 37. The motor 38 is secured to a lower surface of the base chassis 10. For assembling the pulley 37, the drive pulley 38a and the motor 38 with ease, the base chassis 10 is formed with a generally L-shaped opening through which they are partially exposed. A looped belt 39 is put around the drive pulley 38a and the pulley 37.

Thus, the connecting plate 25, the wire 28, the pulleys 31 and 33, the gear 32, the twin gear body 34, the pinion 35, the shaft 36, the pulley 37, the looped belt 39, the drive pulley 38a and the electric motor 38 constitute a disc tray driving mechanism which is generally designated by numeral 30. Thus, upon energization of the electric motor 38, the disc tray 20 is forced to slide forward or rearward along a given way defined by the right and left guide rails 12 and 11.

Figure 3:
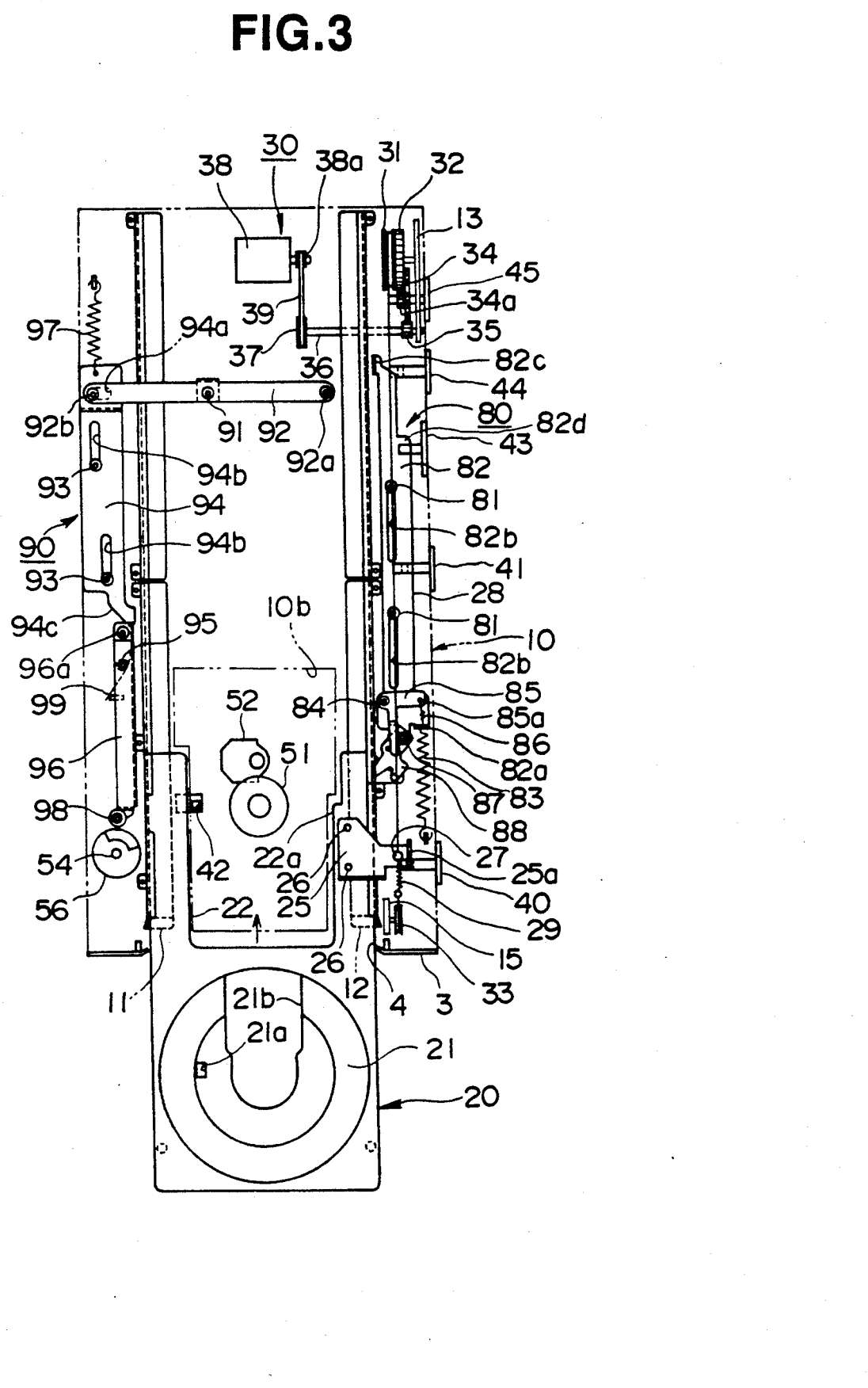
Figure 5:
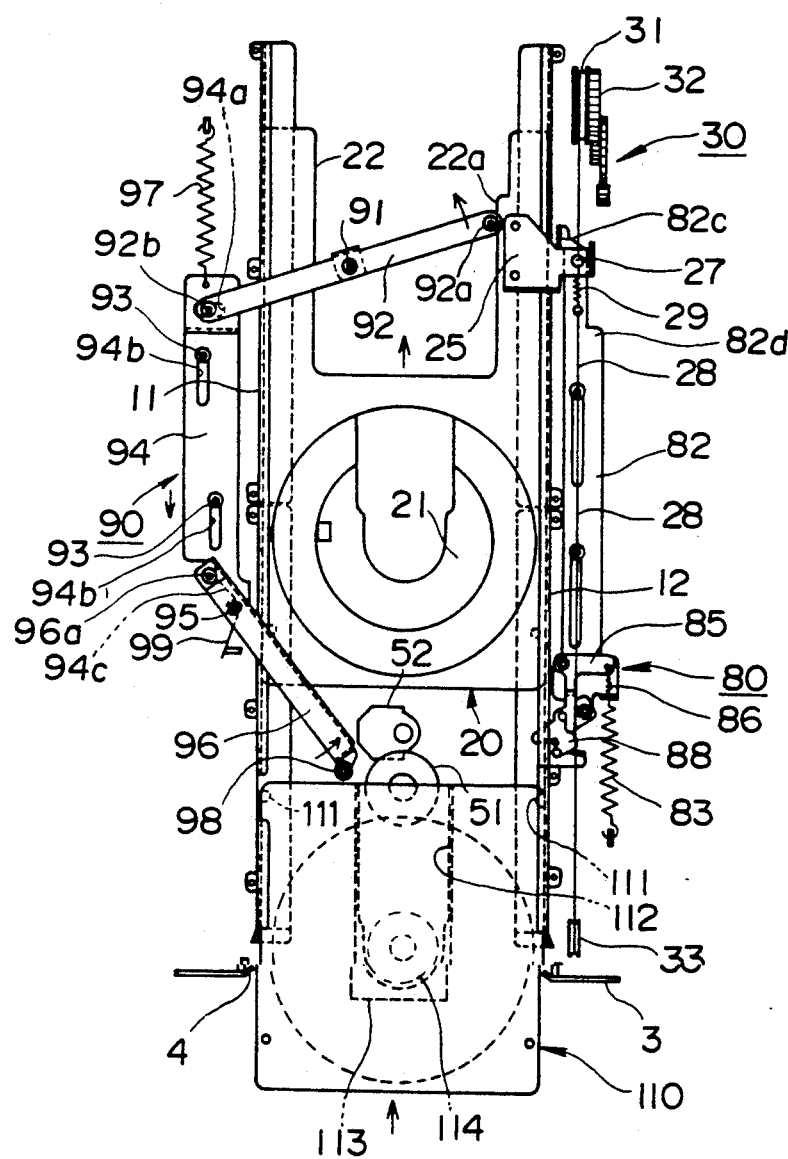
FIG. 5 is a view similar to FIG. 3, but showing a condition wherein the disc player is on standby for insertion of the cartridge.

As will become apparent as the description proceeds, the disc tray 20 has generally four stop positions, the first being the ejected position as shown in FIG. 3, the second being the loading-completed position for the naked disc 100 as shown in FIG. 1, the third being the standby position for insertion of the cartridge 110 as shown in FIG. 5 and the fourth being the loading-completed position for the cartridge 110 as shown in FIG. 2.

As will be clarified hereinafter, when the disc tray 20 is slid rearward from the ejected position (FIG. 3) to the loading-completed (FIG. 1) position, the disc placing depression 21 of the disc tray 20 is inserted into the player housing 2 through the slot 4 of the mouth panel 3. Thus, upon completion of this rearward sliding, the naked disc 100 on the disc placing depression 21 takes the loading-completed position. While, when the disc tray 20 is slid forward from the loading-completed position (FIG. 1) to the ejected position (FIG. 3), the disc placing depression 21 of the disc tray 20 becomes exposed to the outside. Thus, under this condition, the naked disc 100 can be easily removed from the disc placing depression 21.

As will be apparent hereinafter, upon requirement of playing the cartridge 110, the disc tray 20 is slid rearward from the standby position (FIG. 5) to the loading-completed position (FIG. 2) for the cartridge 110 in response to insertion of the cartridge 110 through the slot 4 of the mouth panel 3.

As is understood from FIGS. 1 and 3, a first reflection type photo sensor 40 is mounted to the right front end 10d of the base chassis 10, which senses both the completion of the ejection of the disc tray 20 and the starting of loading movement of the same. As is seen from FIG. 3, when the disc tray 20 comes to the frontmost position (viz., ejected position), the upward bent part 25a of the connecting plate 25 faces the first photo sensor 40. Furthermore, a second reflection type photo sensor 41 is mounted to the right middle part of the base chassis 10, which senses the completion of loading movement of the disc tray 20. As is seen from FIG. 1, when the disc tray 20 comes to the loading-completed position for the naked disc 100, the upward bent part 25a of the connecting plate 25 faces the second photo sensor 41.

As is seen from FIG. 3, a third reflection type photo sensor 42 is mounted to the left front portion of the base chassis 10, which senses whether the naked disc 100 is present on the disc placing depression 21 or not. As is understood from FIG. 4, when the disc tray 20 comes to the loading-completed position for the naked disc 100, the small peephole 21a of the depression 21 faces the third photo sensor 42.

As is seen from FIG. 1, a fourth reflection type photo sensor 45 is mounted to the right rear end of the base chassis 10, which senses the loading-completion of the cartridge 110. That is, as is seen from FIG. 2, when the disc tray 20 comes to the rearmost position (viz., the loading-completed position for the cartridge 110), the upward bent part 25a of the connecting plate 25 faces the fourth photo sensor 45.

As is seen from FIG. 1, between the second photo sensor 41 and the fourth photo sensor 45, there are arranged fifth and sixth reflection type photo sensors 43 and 44, which sense respectively the starting of loading movement of the disc tray 20 for the cartridge 110 and the completion of ejection movement of the disc tray 20 for the cartridge 110.

Each photo sensor 40, 41, 42, 43, 44 or 45 is a known photo sensor comprising a light emitting part and a light receiving part. These photo sensors are connected to a known control unit for controlling the electric motor 38 of the disc tray driving mechanism 30.

As is understood from FIGS. 3, 7, 11 and 12, the pivotal chassis 50 is equipped with a turn table 51 at a position facing the rectangular opening 10b of the base chassis 10. Although not shown in the drawings, a known spindle motor for driving the turn table 51 is used. As is seen from FIG. 12, the turn table 51 is equipped with a magnet ring 51a.

As is seen from FIGS. 3 to 7, an optical pickup 52 is radially movably connected to the pivotal chassis 50 near the turn table 51. For moving the pickup 52, a known carriage including a linear motor, a guide shaft, etc., is employed. As is known, the optical pickup 52 is a means for reading information from the disc 100 or 110 by using a laser beam.

Figure 7:
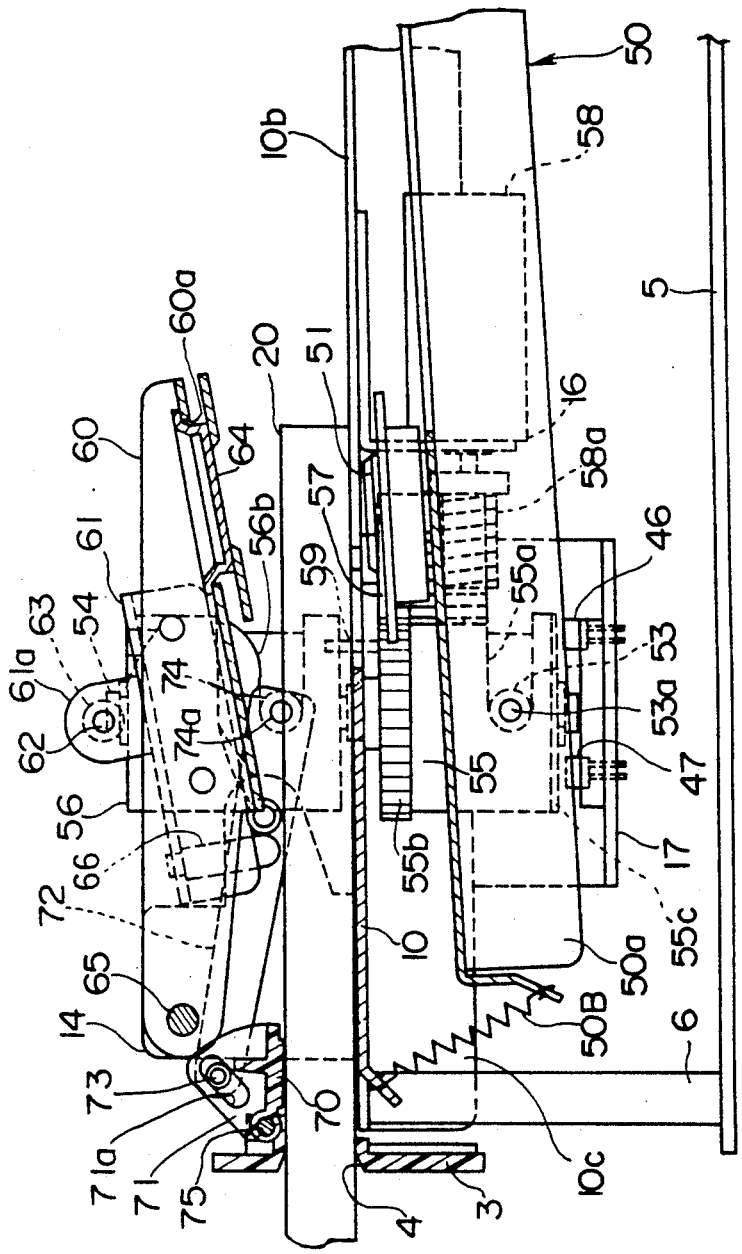
FIG. 7 is an enlarged vertically sectional view of the essential mechanism of the disc player, showing a condition wherein the disc tray is ejected.
Figure 12:
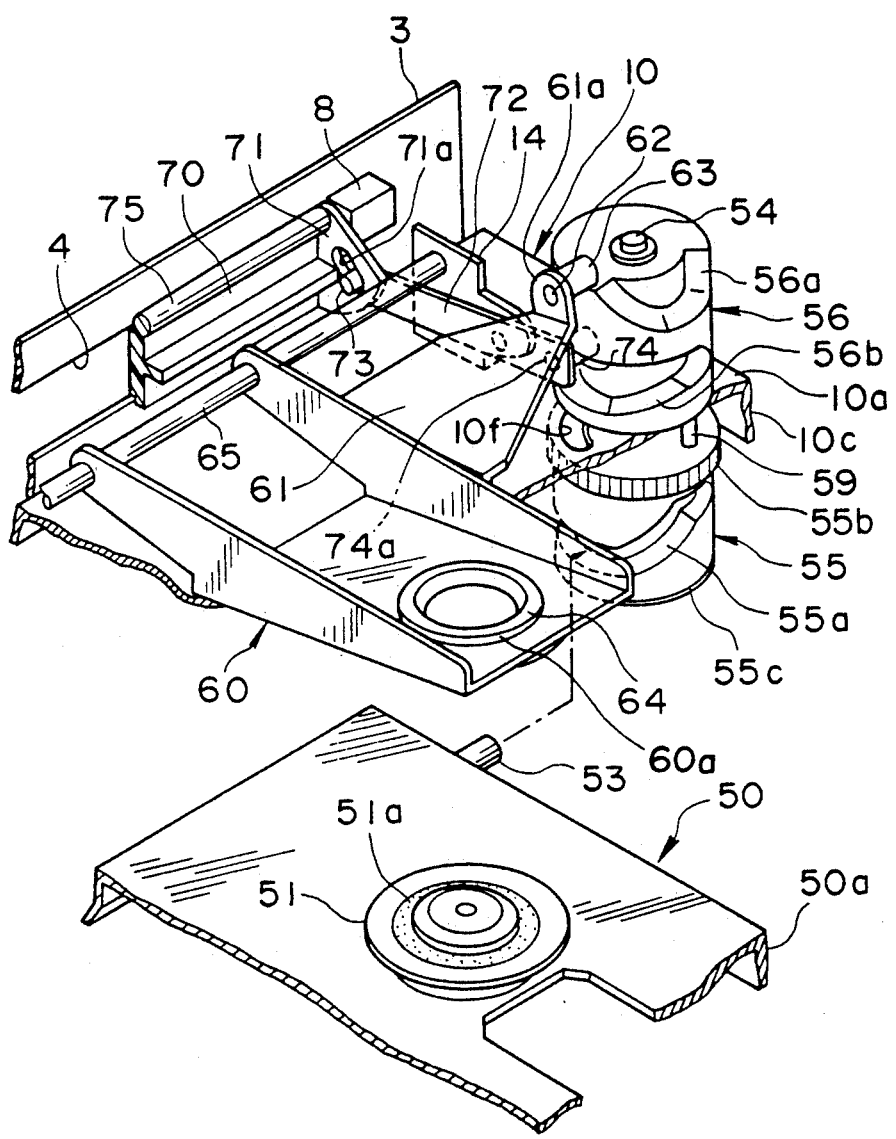
FIG. 12 is an enlarged perspective view of one portion of the essential mechanism of the disc player.

As is seen from FIGS. 7 and 12, a left wall part 50a of the pivotal chassis 50 has at its front outside surface a pin 53a about which a roller (or cam follower) 53 is rotatably disposed. The roller 53 is slidably engaged with a helical cam groove 55a formed around and in a first cylindrical cam 55 which is made of a plastic. The first cylindrical cam 55 is rotatably connected through a shaft 54 to the lower surface of a left front portion of the base chassis 10. The first cylindrical cam 55 is formed at its upper portion with a gear 55b.

As is seen from FIG. 7, the gear 55b of the first cylindrical cam 55 is meshed with an intermediate gear 57 which is rotatably connected to the lower surface of the base chassis 10. The intermediate gear 57 is meshed with a worm gear 58a driven by an electric motor 58 which is fixed through an L-shaped bracket 16 to the lower surface of the base chassis 10.

Thus, when the motor 58 is energized Lo run, the pivotal chassis 50 is forced to pivot upward and downward about the pivot shaft 50A (see FIG. 11). When, as is understood from FIG. 9, the pivotal chassis 50 is pivoted upward to assume its upper position, the turn table 51 and the optical pickup 52 are projected upward through the rectangular opening 10b formed in the base chassis 10. While, when, as is understood from FIG. 7, the pivotal chassis 50 is pivoted downward to its lower position, the turn table 51 and the optical pickup 52 are retracted below the base chassis 10 through the rectangular opening 10b of the same. Thus, under this condition, the loading and unloading movement of the disc tray 20 and that of the cartridge 110 are not obstructed.

As is seen from FIG. 7, below the first cylindrical cam 55, there are arranged a pair of reflection type photo sensors 46 and 47 which are fixed to a generally L-shaped bracket 17 secured to the base chassis 10. These sensors 46 and 47 sense an angular position of the first cylindrical cam 55. For this sensing, a detecting plate 55c (see FIG. 12) is fixed to a lower surface of the first cylindrical cam 55. A spring 50B extends between the front end of the pivotal chassis 50 and that of the base chassis 10 to bias the pivotal chassis 50 upward, that is, toward the base chassis 10.

Figure 13:
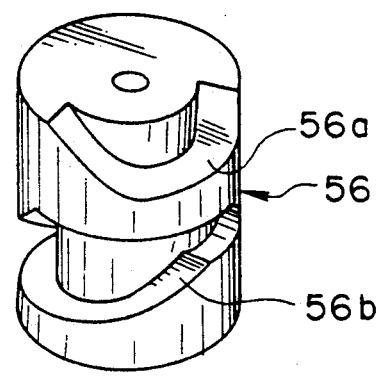
FIG. 13 is an enlarged perspective view of a cylindrical cam employed in the essential mechanism of the disc player.
Figure 14:
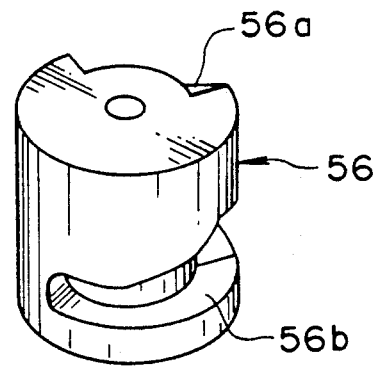
FIG. 14 is a view similar to FIG. 13, but showing a back side of the cylindrical cam.

As is seen from FIG. 12, the shaft 54 of the first cylindrical cam 55 extends upward through the base chassis 10, and a second cylindrical cam 56 of a plastic is also disposed about the shaft 54 above the base chassis 10. The second cylindrical cam 56 is shown in detail in FIGS. 13 and 14. The first and second cylindrical cams 55 and 56 are connected through a pin 59, so that upon energization of the motor 58, they are rotated together like a single unit. The second cylindrical cam 56 is formed at its upper part with a first cam groove 56a and at its lower part with a second cam groove 56b.

As is seen from FIG. 12, a chucking arm 60 is pivotally arranged beside the second cylindrical cam 56, which functions to clamp the naked disc 100 on the turn table 51. Due to rotation of the second cylindrical cam 56 in a given direction, the chucking arm 60 is pivoted downward co clamp the naked disc 100.

That is, as is seen from FIGS. 1 and 2, the chucking arm 60 has front ends secured to a pivot shaft 65 which is pivotally supported by the right and left brackets 14 and 15 of the base chassis 10. The chucking arm 60 is equipped with a lateral lever portion 61 which extends toward the second cylindrical cam 56. The lateral lever portion 61 has a roller (or cam follower) 63 rotatably connected thereto through a pin 62 (see FIG. 12). The roller 63 is operatively engaged with the first cam groove 56a of the second cylindrical cam 56, so that rotation of the cam 56 in one and the other directions induces pivotal movement of the chucking arm 60 about the axis of the pivot shaft 65.

As is seen from FIG. 12, the chucking arm 60 has at its work or leading portion a circular opening 60a into which an annular chucking plate 64 is axially movably disposed. As is seen from FIG. 1, a stopper pin 66 is fixed to a lower surface of the lateral lever portion 61 of the chucking arm 60.

As will become apparent as the description proceeds, the second cam groove 56b of the second cylindrical cam 56 participate in carrying out a pivotal movement of a lid 70 which covers the slot 4 of the mouth panel 3 from inside.

That is, as is seen from FIG. 12, the lid 70 for covering the slot 4 is pivotally connected through a pivot shaft 75 to a rear surface of the mouth panel 3. For pivotally supporting the pivot shaft 75, two brackets 8 (only one is shown in FIG. 12) are fixed to the mouth panel 3. Each end of the lid 70 has a normally bent sector portion 71. The left (as viewed from a viewer standing in front of the disc player 1) sector portion 71 is formed with an inclined guide slot 71a. Slidably engaged with the guide slot 71a is a pin 73 fixed to one end of a link 72 which is pivotally connected to the left bracket 14 through a pin (no numeral). The other end of the link 72 has a roller (or cam follower) 74 rotatably connected thereto through a pin 74a. The roller 74 is operatively engaged with the second cam groove 56b of the second cylindrical cam 56, so that rotation of the cam 56 in one and the other directions induces pivotal (viz., opening and closing) movement of the lid 70.

Figure 4:
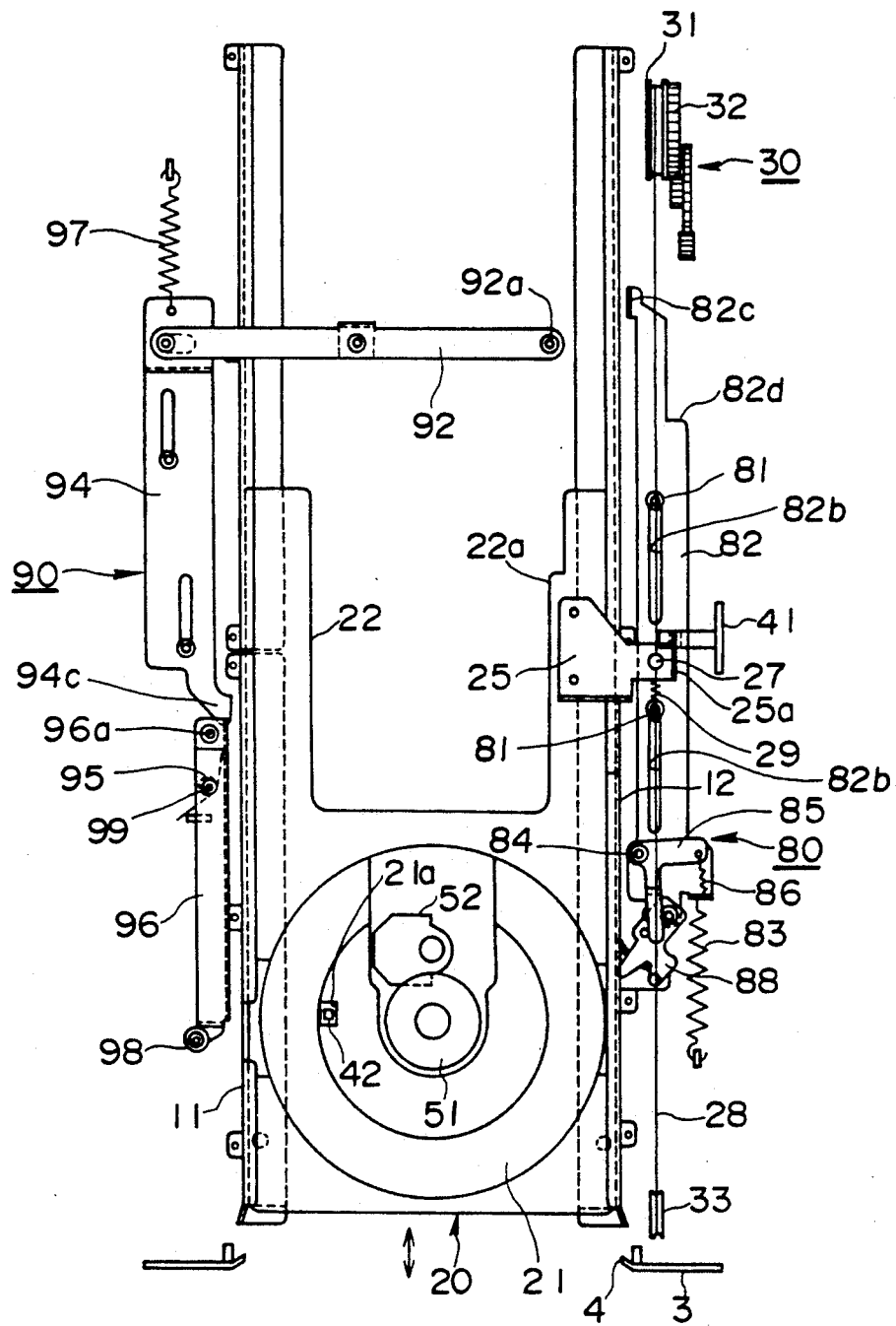
FIG. 4 is a view similar to FIG. 3, but showing a condition wherein the disc tray is retracted into the player housing.

As is best shown in FIG. 4, at the right edge portion of the base chassis 10, there is arranged a cartridge carrying mechanism 80 which functions to carry the cartridge 110 to a given position below the rectangular opening 10b of the base chassis 10.

That is, the mechanism 80 comprises a link 82 which has two aligned slots 82b formed therethrough. These slots 82b are slidably engaged with front and rear pins 81 secured to a generally middle part of the right edge portion of the base chassis 10, so that the link 82 can slide forward and rearward on the chassis 10 along the right guide rail 12. The link 82 is biased forward by a tension spring 83 arranged in front of the link 82. A generally L-shaped flip-flop lever 85 is pivotally connected through a pivot pin 84 to a front end of the link 82.

Figure 15:
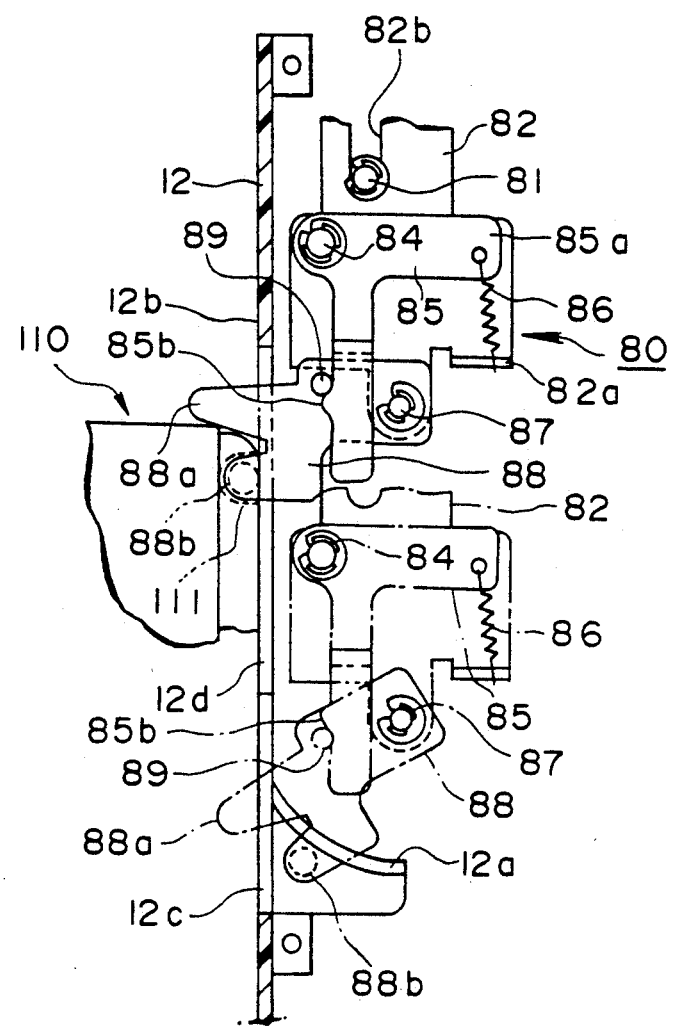
FIG. 15 is an enlarged plan view of an essential portion of a cartridge carrying mechanism employed in the disc player.

As is seen from FIG. 15, between a first arm portion 85a of the flip-flop lever 85 and a raised front part 82a of the link 82, there extends a spring 86 by which the flip-flop lever 85 is biased in a clockwise direction in FIG. 15. To the frontmost end of the link 82, there is pivotally connected a hook lever 88 through a pivot shaft 87.

As is seen from FIG. 4, the link 82 has at its rear end a raised portion 82c to which the connecting plate 25 of the disc tray 20 is engageable. That is, when the connecting plate 25 pushes the raised portion 82c, the link 82 is moved rearward permitting movement of the cartridge 110 to a given position in the housing 2. While, when the connecting plate 25 is disengaged from the raised portion 82c, the link 82 is moved forward permitting ejection of the cartridge 110 from the housing 2.

As is seen from FIG. 15, a second arm portion of the flip-flop lever 85 is formed at its left side with a projection 85b. The hook lever 88 is formed with both a downwardly depressed pawl portion 88a and a projected portion. The projected portion has a pin 88b integrally connected to a lower surface thereof. The hook lever 88 further has on its upper surface a pin 89 which is engageable with the projection 85b of the flip-flop lever 85.

As is understood from FIGS. 2 and 15, the right guide rail 12 is formed at its front portion with a laterally outwardly projected portion 12a. The portion 12a has an arcuate wall to which the pin 88b of the hook lever 88 is engageable. A raised wall part 12b of the right guide rail 12 is formed with a generally L-shaped aperture (12c+12d) which includes a larger rectangular slot 12c which is sized to receive both the pawl portion 88a and the pin (88b)-mounted projected portion of the hook lever 88 and a smaller rectangular slot 12d which is sized to receive only the pawl portion 88a. As is seen from FIG. 15, the smaller rectangular slot 12d is positioned near the projected portion 12a.

As is seen from FIG. 2, upon completion of loading for the cartridge 110 by the cartridge carrying mechanism 80, the disc tray 20 assumes its rearmost position.

As is best shown in FIG. 2, at the left edge portion of the base chassis 10, there is arranged a shutter controlling mechanism 90 which functions to open and close a shutter 113 of the cartridge 110. The shutter 113 is arranged to open and close an opening formed in a bottom wall of the cartridge, to which opening the disc proper is exposed.

Figure 6:
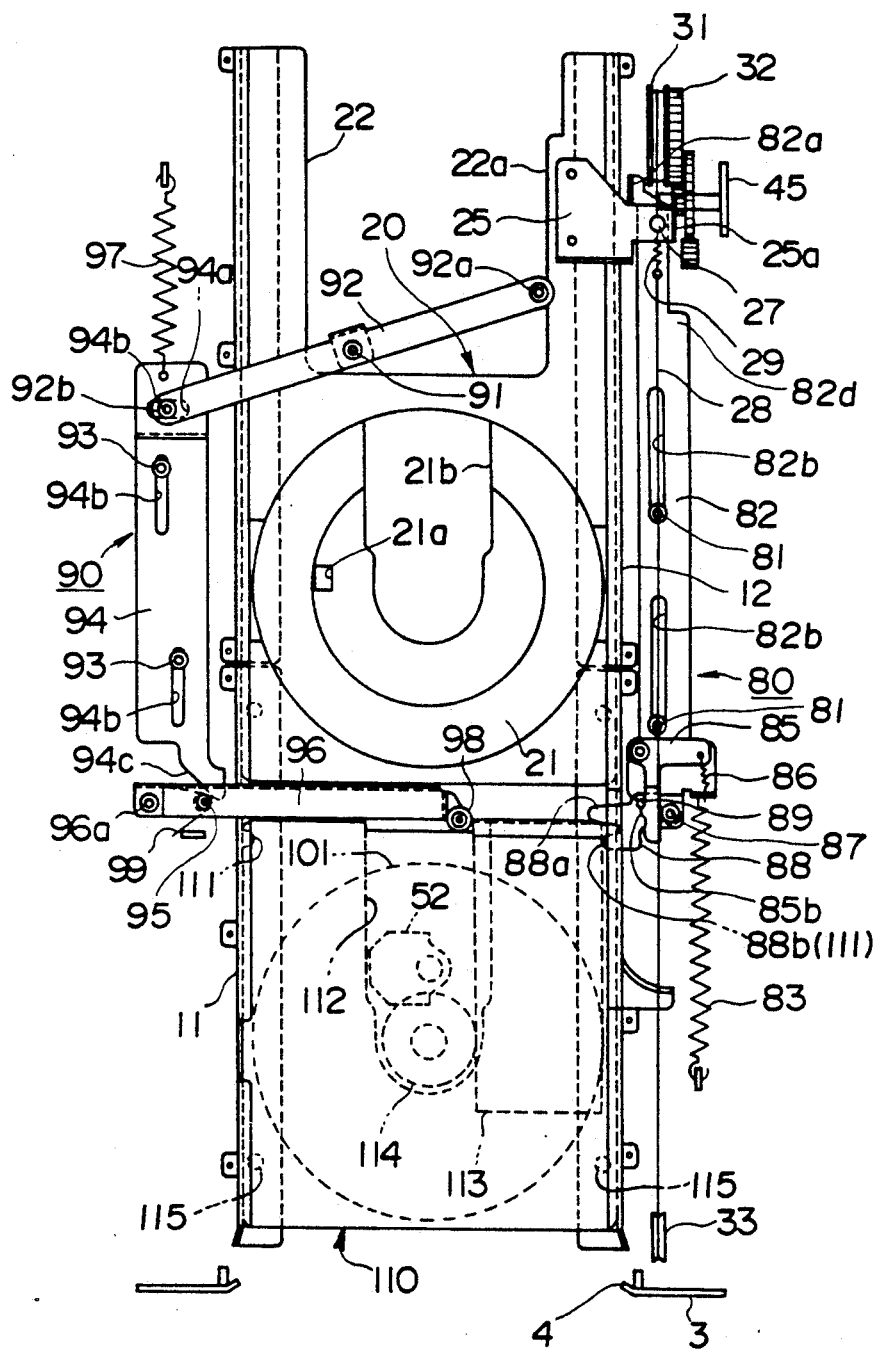
FIG. 6 is a view similar to FIG. 5, but showing a condition wherein loading of the cartridge is completed.

As is seen from FIGS. 2 and 6, the shutter controlling mechanism 90 comprises a first link 92 which is pivotally connected through a pivot shaft 91 to the upper surface of the base chassis 10. One end of the first link 92 is equipped with a roller 92a rotatably engaged with the inside wall of the right leg portion of the disc tray 20 on which the inclined cam surface 22a is formed. The other end of the first link 92 is equipped with another roller 92b. The roller 92b is operatively received in an elongate slot 94a which is formed in a rear end of a second link 94. Due to provision of a spring 97, the second link 94 is biased rearward. The second link 94 has two longitudinally extending slots 94b formed therethrough. These slots 94b are slidably engaged with front and rear pins 93 secured to the generally middle part of the left edge portion of the base chassis 10, so that the second link 94 can slide forward and rearward on the chassis 10 along the left guide rail 11. That is, due to a pivotal connection therebetween, the pivotal movement of the first link 92 about the pivot shaft 91 induces forward and rearward movement of the second link 94. The second link 94 has an inclined front end 94c to which a roller 96a of a shutter opening arm 96 is engageable. The roller 96a is rotatably connected to a left end of the arm 96.

As will be understood from FIGS. 4 to 6, when the disc tray 20 is moved rearward, the inside wall (viz., the wall on which the cam surface 22a is formed) of the right leg portion of the disc tray 20 is brought into contact with the roller 92a of the first link 92 and then pushes the same rearward against the force of the spring 97. The shutter opening arm 96 has at its inward end a roller 98 which is engageable with the shutter 113 (see FIG. 2) of the cartridge 110 to open the same. Usually, a spring is installed in the cartridge 110 to bias the shutter 113 in a closing direction. Thus, when the roller 98 of the shutter opening arm 96 is disengaged from the shutter 113, the shutter 113 is automatically returned to close the disc exposing opening of the cartridge 110.

As is understood from FIGS. 4 and 5, the shutter opening arm 96 is pivotally connected through a pivot shaft 95 to the base chassis 10. Due to biasing force of a spring 99 disposed about the pivot shaft 95, the shutter opening arm 96 is biased in a counterclockwise direction to have a rest position wherein the arm 96 is in parallel with the left guide rail 11 as shown in FIG. 4.

In the following, operation of the disc player 1 will be described with reference to the accompanying drawings.

For ease of understanding, the description will be commenced with respect to a rest condition of the disc player 1 wherein, as is seen from FIG. 5, the disc tray 20 assumes the standby position.

Figure 8:
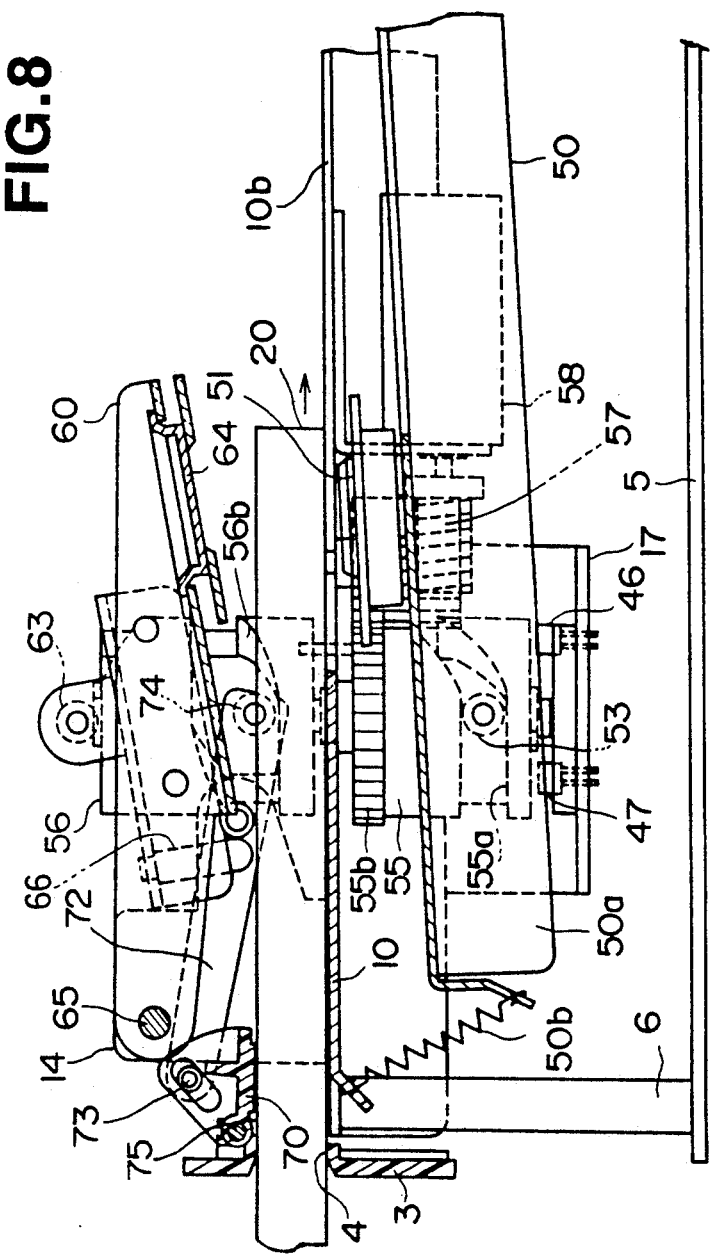
FIG. 8 is a view similar to FIG. 7, but showing a condition wherein the disc tray is being moved for loading.

Under this condition, as is understood from FIG. 8, the pivotal chassis 50 assumes its lower position and thus the turn table 51 and the optical pickup 52 are located below the base chassis 10. Furthermore, the chucking arm 60 assumes its upper position. Furthermore, as is understood from FIG. 5, the shutter controlling mechanism 90 is in idle condition.

When now playing of a naked disc 100 is required, an eject switch 9 (see FIG. 16A) is pushed. With this, the electric motor 58 (see FIG. 7) is energized causing the second cylindrical cam 56 to turn in a given direction. Thus, as is understood from FIG. 7, the lid 70 is pivoted upward to open the slot 4 of the mouth panel 3. Upon the eject switch 9 being pushed, the electric motor 38 of the disc tray driving mechanism 30 is also energized to run in one direction, so that as is seen from FIGS. 3 and 16B, the disc tray 20 is moved forward from the standby position (FIG. 5) and ejected through the slot 4 having the disc placing depression 21 exposed to the outside.

One naked disc 100 is then manually put on the disc placing depression 21. When thereafter the eject switch 9 is pushed again or a front face 20a (see FIG. 16B) of the ejected disc tray 20 is pushed with a certain force, the motor 38 is energized to run in the other direction, so that the disc tray 20 is slid into the housing 2 together with the naked disc 100. Because the pivotal chassis 50 is kept in the lower position as has been mentioned hereinabove, the inward movement of the disc tray 20 is smoothly carried out without being blocked by the turn table 51 and optical pickup 52.

When then, as seen from FIG. 1, the disc tray 20 comes to the given position wherein the bent part 25a of the connecting plate 25 secured to the disc tray 20 faces the photo sensor 41, the sensor 41 senses that the disc tray 20 has reached the loading-completed position and stops the motor 38. Under this condition, the center of the disc placing depression 21 of the disc tray 20 is located just above the turn table 51 which is in the retracted state, and the small peephole 21a of the disc tray 20 is positioned just above the third photo sensor 42.

Figure 9:
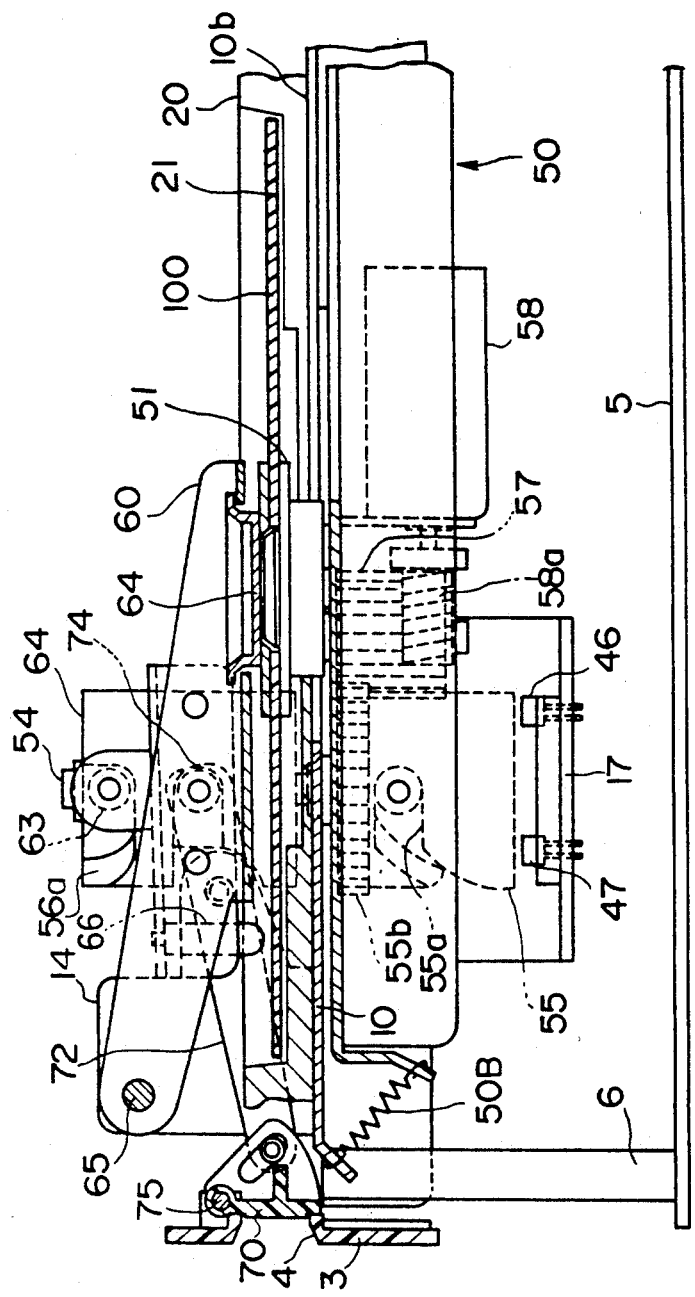
FIG. 9 is a view similar to FIG. 7, but showing a condition wherein the naked disc is being played.

Upon completion of the loading for the naked disc 100, the third photo sensor 42 senses that the naked disc 100 is present, on the disc placing depression 21. Upon this, the motor 58 is energized to run in one direction causing the first and second cylindrical cams 55 and 56 to turn in a given direction. With this, the pivotal chassis 50 is pivoted upward to the upper position lifting the turn table 51 and the optical pickup 52 to their working positions, and at the same time, the chucking arm 60 is pivoted downward to its working position. Thus, finally, the disc play 1 assumes the condition as shown in FIG. 9 wherein the naked disc 100 is supported on the turn table 51 and rotatably clamped by the chucking plate 64 of the chucking arm 60.

When, under this condition, a play start switch (not shown) is pushed, the turn cable 51 is driven by the spindle motor (not shown) for turning the naked disc 100, and the optical pickup 52 is moved radially for reading information from the naked disc 100.

When, after stopping of the turn table 21, the eject switch 9 is pushed, reversed movements of the parts are carried out for ejecting the disc tray 20 together with the naked disc 100. That is, the disc tray 20 is ejected having the naked disc 100 on the disc placing depression 21 exposed to the outside. When, after removing the naked disc 100 from the ejected disc tray 20, the eject switch 9 is pushed again or the front face 20a of the ejected disc tray 20 is pushed with a certain force, the disc tray 20 is inserted into the housing 2 and stopped at the standby position of FIG. 5. This is because the third photo sensor 42 senses absence of the naked disc 100 on the disc placing depression 21. Thus, if the third photo sensor 42 finds another naked disc 100 in the returning disc tray 20, it stops the tray 20 at the loading-completed position of FIG. 1.

It is to be noted that during the returning movement of the disc tray 20 to the standby position of FIG. 5, the stepped cam portion 22a of the right leg portion of the disc tray 20 abuts against and pushes the roller 92a of the first link 92 of the shutter controlling mechanism 90. With this, the first link 92 is pivoted against the force of the spring 97 causing forward movement of the second link 94 by a distance determined by the length of each slot 94b. The forward movement of the second link 94 causes the inclined front end 94c thereof to push the roller 96a of the shutter opening arm 96. Thus, the shutter opening arm 96 is pivoted counterclockwise about the pivot shaft 95 against the force of the spring 99 as is shown in FIG. 5. Thus, when the disc tray 20 assumes the standby position of FIG. 5, the shutter opening arm 96 takes its standby position as shown.

When now playing of a cartridge 110 is required, the cartridge 110 is manually inserted into the slot 4 of the disc player 1 forcing the lid 70 to open. Due to the nature of the second cam groove 56b of the second cylindrical cam 56, the opening movement of the lid 70 is not obstructed by the cam 56.

When the cartridge 110 comes to a certain position in the housing 2, the shutter 113 of the cartridge 110 is brought into abutment with the roller 98 of the shutter opening arm 96. Thus, the subsequent inward movement of the cartridge 110 causes the roller 98 to open the shutter 113, as is seen from FIG. 6. During this, the shutter opening arm 96 is pivoted counterclockwise about the pivot shaft 95 against the spring 99.

When the cartridge 110 is further inserted into the housing 2, the leading right corner of the cartridge 110 comes into abutment with the pawl portion 88a of the hook lever 88 causing pivoting movement of the lever 88 about the pivot shaft 89. With this, as is understood from FIG. 15, the pin 88b of the hook lever 88 is inserted into a recess 111 formed in the cartridge 110, and the pin 89 of the hook lever 88 gets over the projection 85b of the flip-flop lever 85, resulting in that as is shown by the solid line in FIG. 15, the hook lever 88 clamps the cartridge 110 with an aid of the flip-flop lever 85 biased by the spring 86.

When the cartridge 110 is further inserted into the housing 2, the link 82 is moved rearward. This is because the external force applied to the cartridge 110 is transmitted to the link 82 through the pivot shaft 87. During this inward movement of the cartridge 110, the pin 88b of the hook lever 88 slides along the raised wall part 12b of the right guide rail 12. As will be understood from FIG. 6, the rearward movement of the link 82 is guided by the front and rear pins 81 of the base chassis 10. When the link 82 comes to a given position wherein a shoulder part 82d of the link 82 faces the fifth photo sensor 43, the sensor 43 operates to energize the electric motor 38 of the disc tray driving mechanism 30 and thus the disc tray 20 is moved toward its rearmost position. During this, the connecting plate 25 of the disc tray 20 comes into abutment with the raised front part 82a of the link 82 causing a further rearward movement of the link 82 against the force of the spring 83. Due to the latched engagement between the cartridge 110 and the hook lever 88 mounted on the link 82, the rearward movement of the link 82 draws the cartridge 110 deeply into the housing 2. When the disc tray 20 comes to its rearmost position of FIG. 2 wherein the bent part 25a of the connecting plate 25 faces the fourth photo sensor 45 as shown in FIG. 2, the sensor 45 operates to deenergize the motor 38 to stop the disc tray 20 at the rearmost position. Under this condition, the center of the cartridge 110 is located just above the turn table 51 which is in the retracted state.

Figure 10:
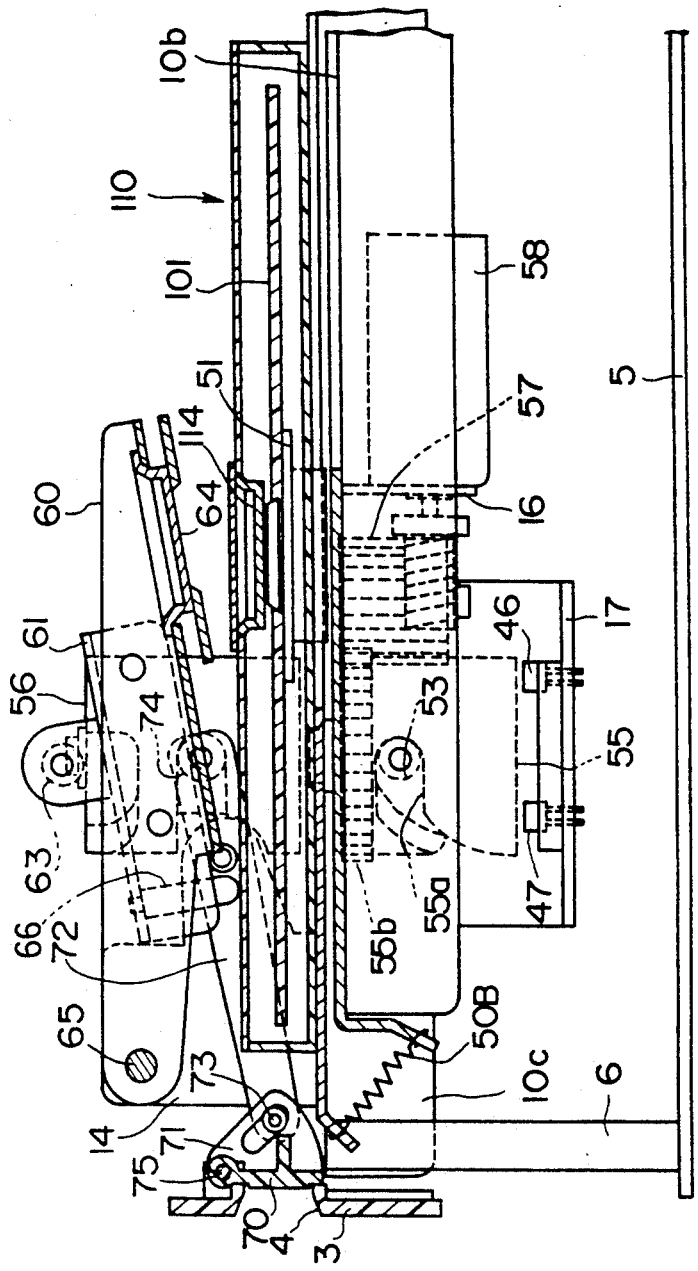
FIG. 10 is a view similar to FIG. 7, but showing a condition wherein the cartridge is being played.

Upon completion of the loading for the cartridge 110, the third photo sensor 42 senses that the cartridge 110 is present at the given position in the housing 2. Upon this, the motor 58 is energized to run in one direction causing the first cylindrical cam 55 (more specifically, the first and second cylindrical cams 55 and 56 together) to turn in a given direction. With this, the pivotal chassis 50 is pivoted upward to the upper position lifting the turn table 51 and the optical pickup 52 to their working positions. Thus, as is shown in FIG. 10, under this condition, the disc 101 in the cartridge 110 is supported on the turn table 51 and the center of the disc 101 is pressed against a rotatable chucking disc 114 installed in the cartridge case 110. Of course, the energization of the motor 58 rotates the second cylindrical cam 56 and thus intends to lower the chucking arm 60. However, as is seen from FIGS. 2 and 10, such lowering of the chucking arm 60 is suppressed by the stopper pin 66 of the chucking arm 60 which abuts against an upper wall of the cartridge case 110.

When under this condition, the play start switch is pushed, the turn table 51 is driven by the spindle motor (not shown) for turning the disc 101 in the cartridge 110, and the optical pickup 52 is moved radially for reading information from the disc 101.

When, after stopping of the turn table 21, the eject switch 9 is pushed, reversed movements of the parts are carried out for moving the disc tray 20 forward to the standby position as shown in FIG. 5. Thus, as is seen from FIG. 16C, the cartridge 110 is partially ejected from the slot 4 of the housing 2. Since, under this condition, the hook lever 88 (more specifically, the pin 88b of the lever 88) releases the cartridge 110, the cartridge 110 can be easily removed from the slot 4.

In the following, advantages of the present invention will be described.

First, the disc player 1 of the present invention can play both the naked disc 100 and the cartridge 100. Thus, the disc player 1 can be made compact and economical irrespective of its multiplicity of usage. In fact, there is no need for bearing the troublesome manual work for getting the naked disc into a separate cartridge case. On the other hand, for prolongation of life, a frequently used naked disc 100 can be played within the cartridge case. Furthermore, since insertion into and ejection of both the naked disc 100 and the cartridge 110 from the player 1 can be made through the single slot 4 and since the retracted position of the disc tray 20 for playing the cartridge 110 is obtained by horizontally moving the disc tray 20, the thickness of the disc player 1 can be considerably reduced.

Second, due to usage of the third photo sensor 42, respective standby conditions for the naked disc 100 and the cartridge 110 are automatically assumed by the disc player 1. That is, when the sensor 42 senses presence of a disc (viz., the naked disc 100) on the disc placing depression 21 through the peephole 21a of the disc tray 20, the turn table 51 and the chucking arm 60 are moved to their working positions to clamp the disc 100, while, when the sensor 42 senses absence of such disc, the disc tray 20 is moved rearward to the standby position for the cartridge 110. That is, there is no need of providing the front face of the disc player 1 with a selection switch with which the standby conditions for the naked disc 100 and the cartridge 110 are manually selected.

Third, since the left and right guide rails 11 and 12 are constructed to guide both the disc tray 20 and the cartridge 110, the entire construction of the loading mechanisms can be made compact in size.

Fourth, since the loading/unloading operation for the cartridge 110 and the opening/closing operation for the shutter 113 of the cartridge 110 are induced by the movement of the powered disc tray 20, there is no need of providing a separate motor which drives exclusively the cartridge carrying mechanism 80 and shutter controlling mechanism 90.

Although the foregoing description is directed to disc players of read-only type, the concept of the present invention is applicable to also disc players of write/read type.

What is claimed is:

1. An apparatus for playing both a naked disc and a disc encased in a cartridge, said disc being of a recording medium, said apparatus comprising:
   means defining an inlet opening;
   a disc tray movable to take a first position at which said disc tray can receive the naked disc, a second position at which loading of the received naked disc is completed and a third position which is opposite to said first position with respect to said second position, said disc tray being movable between said first and second positions through said inlet opening;
   a cartridge carrying mechanism for receiving the cartridge inserted through said inlet opening and carrying said cartridge to a loading position at which loading of said cartridge is completed;
   chucking means for chucking said naked disc;
   a turn table pivotal between a working position and a rest position, said turn table being capable of driving either one of the loaded naked disc and the disc in the loaded cartridge when assuming said working position;
   a naked disc detecting means issuing an information as to whether or not said naked disc is on said disc tray at said second position; and
   control means for controlling the position of said disc tray in accordance with the information from said naked disc detecting means, said controlling means permitting said disc tray to move to said third position when said naked disc detecting means detects absence of said naked disc on said disc tray at said second position.

2. An apparatus according to claim 1, wherein said disk tray is further movable away from said third position to a fourth position, and wherein said cartridge carrying mechanism is driven to carry said cartridge in relation to the movement of said disc tray between said third and fourth positions.

3. An apparatus according to claim 2, wherein said controlling means comprises an electric motor which, when energized, driven said disc tray to move between first, second, third and fourth positions.

4. An apparatus according to claim 3, further comprising a cartridge detecting means which detects whether or not said cartridge is moved to a predetermined position from said inlet opening, said disc tray being moved from said third position to said forth position by said motor when said cartridge detecting means detects the movement of said cartridge to the predetermined position.

5. An apparatus according to claim 1, further comprising means for controlling said chucking means to selectively take a chucking position at which said loaded naked disc is chucked and a waiting position upward away from said second position in accordance with at least the information issued from said naked disc detecting means, so that said disc tray is put on said waiting position when said naked disc is not loaded.

6. An apparatus according to claim 1, further comprising:
a lid which is pivotally movable between a closing position at which said lid covers said inlet opening and an opening position at which said lid opens said inlet opening permitting insertion of said disc tray and said cartridge through said inlet opening; and
means for controlling said lid to selectively take said closing and opening positions.

7. An apparatus according to claim 6, wherein the means for controlling said lid controls said lid to take said opening position before said disc tray is moved from said second position to said first position.

8. An apparatus according to claim 1, further comprising:
a shutting opening arm which is pivotally connected to a fixed portion and selectively takes its first position not to contact with said disc tray, its second position to close a shutter of said cartridge and its third position to open said shutter, at least a part of said disc in the cartridge being exposed when said shutter is opened; and
means for controlling said shutter opening arm to selectively take said first and second position in relation to the movement of said disc tray.

9. An apparatus according to claim 8, wherein said means for controlling said shutter opening arm comprises a cam follower which is engageable with a cam surface formed on said disc tray.

10. An apparatus according to claim 1, wherein said cartridge carrying mechanism includes a holding device which holds said cartridge inserted.

11. An apparatus according to 4, in which said cartridge detecting means comprises:

means for detecting completion of loading of said cartridge; and
means for detecting starting of the loading movement of said disc tray for said cartridge.

12. An apparatus according to claim 11, further comprising means for detecting completion of ejection movement of said disc tray for said cartridge.

13. An apparatus according to claim 12, further comprising:
means for detecting both completion of ejection of said disc tray and starting of the loading movement of the same; and
means for detecting completion of the loading movement of said disc tray.

14. An apparatus according to claim 13, further comprising means for detecting an angular position of said turn table.

15. An apparatus according to claim 1, further comprising:
a base chassis on which said disc tray, said cartridge carrying mechanism and said chuck means are mounted;
a pivotal chassis pivotally connected to said base chassis and having said turn table mounted thereon; and
means for controlling the pivotal movement of said pivotal chassis relative to said base chassis in accordance with the movement of said disc tray.

16. An apparatus according to claim 15, in which the means for controlling the pivotal movement of said pivotal chassis comprises:
an electric motor;
a first cylindrical cam rotated by said electric motor, said first cylindrical cam having a helical groove formed therearound; and
a projected structure held by said pivotal chassis and slidably engaged with said helical groove of said first cylindrical cam.

17. An apparatus according to claim 16, in which said projected structure comprises:
a pin secured to said pivotal chassis; and
a roller rotatably disposed about said pin, said roller being slidably and rotatably engaged with said helical groove of said first cylindrical cam.

18. An apparatus according to claim 16, further comprising means for controlling said chucking means in response to the pivotal movement of said pivotal chassis, said means comprising:
a second cylindrical cam coaxially connected to said first cylindrical cam to rotate therewith; and
means for actuating said chucking means when said second cylindrical cam is rotated about its axis.

* * * * *